(12) United States Patent
Addario

(10) Patent No.: US 7,712,950 B1
(45) Date of Patent: May 11, 2010

(54) DETACHABLE LIGHT ASSEMBLY

(75) Inventor: Aldo Addario, Charlestown, RI (US)

(73) Assignee: A Addario, Charlestown, RI (US)

( * ) Notice: Subject to any disclaimer, the term of this patent is extended or adjusted under 35 U.S.C. 154(b) by 82 days.

(21) Appl. No.: 12/290,030

(22) Filed: Oct. 27, 2008

(51) Int. Cl.
*H01R 33/00* (2006.01)

(52) U.S. Cl. ...................... 362/655; 362/370; 362/659; 439/368

(58) Field of Classification Search ................. 362/370, 362/625, 655, 656–659; 439/346, 368
See application file for complete search history.

(56) References Cited

U.S. PATENT DOCUMENTS

| | | | |
|---|---|---|---|
| 4,300,188 A | | 11/1981 | Addario |
| 5,428,516 A | * | 6/1995 | Harris .......................... 362/655 |
| 5,544,022 A | | 8/1996 | Blackard |
| 5,727,865 A | | 3/1998 | Caldwell |
| 6,604,838 B2 | * | 8/2003 | Jautz .......................... 362/656 |
| 6,682,303 B2 | * | 1/2004 | Wu ............................. 362/652 |
| 7,025,490 B1 | * | 4/2006 | Tseng ......................... 362/653 |

* cited by examiner

*Primary Examiner*—Stephen F Husar
(74) *Attorney, Agent, or Firm*—Mark E. Pochal

(57) ABSTRACT

An improved multi-point locking mechanism in combination with a lamp assembly and a support assembly with mating, cooperating plug connectors providing a detachable lamp assembly for use on vehicles, such as boat trailers, for quick removal before exposure to corrosive water. The improved locking mechanism, in addition to providing a means for quick detachment and removal of the light assembly, provides a stronger and durable engagement with the support assembly preventing accidental dislodgement while towing vehicles, like boat trailers. The locking mechanism comprising a corrosive resistant L-shaped member having a horizontal extending plate with a hole through the distal end, and a downward depending section retractably positioned within the support assembly. In the engaged position, the L-shaped member being in a downward position, a receiving pin on the lamp assembly is mated with the support assembly by alignment with the hole in the horizontal plate and the depending section being in communication with a cut-out section in the cooperating plug connector providing the multi-point locking mechanism.

2 Claims, 4 Drawing Sheets

DETACHABLE LIGHT ASSEMBLY

BACKGROUND OF THE INVENTION

1. Field of the Invention

The present invention relates to an improved locking mechanism in combination with a detachable light system for use on vehicles, such as boat trailers and more particularly, pertains to a multi-point locking means providing quick and easy removal of trailer lights with respect to a boat trailer, quick engagement of the trailer lights and a durable locking means preventing inadvertent detachment when towing the vehicle.

2. Description of the Prior Art

A detachable light system for use on a boat trailer is highly desirable to eliminate exposure of the lighting system to corrosion from repeated launching of a boat from a boat trailer. The ease of quick and easy removal of trailer lights, in particular, and quick re-engagement is essential features of these devices. Of equal importance, a highly desirable feature is a device that provides improved durability and security eliminating the inadvertent dislodgment of the trailer light during towing of the vehicle creating a hazardous condition from lack of illumination of the vehicle.

The improved locking mechanism allows for easy and quick assembly and disassembly of the detachable light system and also provides a more durable and secure locking mechanism preventing inadvertent disengagement from the boat trailer during travel. The present improvement provides a quick and easy system to detach the light assemblies from the boat trailer prior to submersion into the water for launching and loading of the boat preventing corrosion to the light assembly. In addition, upon removal of the boat and trailer for traveling, the improved locking mechanism allows quick and easy reattachment with the additional security of a multi-point locking means to ensuring the light assembly will not detach from the trailer during travel even on hazardous roadways.

The prior art systems provide a cumbersome means in attempt to produce the advantages of the present improved locking system. U.S. Pat. No. 5,544,022 discloses the use of a pair of posts and apertures having a fishing rod holding chamber. This invention requires the additional purchase of posts for the light assembly and may not be used on all trailers without adaptation of the trailer if not designed with the built-in rod holders. The present improved locking mechanism for a detachable light assemble is adaptable to any trailer without any alterations required.

U.S. Pat. No. 4,300,188 discloses a detachable light system in which the light assembly is quickly and easily removed from a support assembly. The locking means disclosed is a latch mechanism engaging the removable lamp assembly to provide a unitary operable light system. The latch mechanism disclosed is a flexible leaf-spring arm attached to either the light assembly or the support assembly. After repeated use of said latch mechanism in engaging and disengaging the lamp assembly, the latch mechanism has a tendency to provide a less secure attachment increasing the likelihood of inadvertent detachment or resulting in loose contact of the lighting system during obverse driving conditions or repeated use over time. In addition since the latch mechanism is mounted on either the lamp assembly or the support assembly it is exposed to come in contact with debris or any matter during travel that could cause inadvertent release of the latch mechanism resulting in complete loss of a light assembly or dysfunctional operation from loose contacts.

Therefore, it can be appreciated that a need for a new and improved locking mechanism in combination with a detachable lighting system exists to prevent the potential of inadvertent detachment from the vehicle of these detachable light systems during travel. In this regard, the present invention substantially fulfills this need.

SUMMARY OF THE INVENTION

The purpose of the present invention is to provide a new and improved locking mechanism in combination with a detachable light system which has the advantages of the prior art and none of the disadvantages.

The present invention essentially provides a multi-point, corrosive resistant locking mechanism use in combination with a support assembly mated by connector plugs to a light assembly. The present invention comprises a corrosive resistant L-shaped member having a horizontal plate and a downward descending section. The horizontal plate having a hole at the distal end from the downward depending section. The downward depending section being retractably positioned between two rectangular members of the support assembly. The light assembly consisting of a rectangular plate having a plurality of connecting prongs extending from a side in alignment with corresponding recessive channels in the support assembly. At least on of the connector prongs having a cut-out section contained therein. The light assembly further containing a receiving pin on a top side of the rectangular plate. In the engaged state, wherein the light assembly and support assembly are mated by communication of the connector prongs to the recessive channels, the multi-point locking mechanism consists of the downward depending section of the L-shaped member being in communication within the cut-out portion of the connector prong and the horizontal member in communication with the light assembly through communication of the receiving pin aligned with the distal hole.

It is understood that the present invention is not limited in its application to the details of construction and to the arrangements of the components set forth in the following description or illustrated in the drawings.

Those skilled in the art will appreciate the conception which this disclosure is based and may readily be utilized for designing other structures, systems or methods to carry out the same purposes of this invention. Therefore, it is important that the claims be regarded as including equivalent constructions insofar as they do not depart from the spirit and scope of the present invention.

It is an object of the present improvement to provide a locking mechanism eliminating the use of the latch mechanism.

It is further an object of the present improvement to provide a double locking means to withstand any type of driving conditions or unlimited times of launching and removal of the boat and trailer from the water.

It is further an object of the present improvement to provide an enhanced locking mechanism for attachment of the light assembly to the support assembly and still provide the ease and quickness for engagement and re-engagement to the boat trailer.

DESCRIPTION OF THE PREFERRED EMBODIMENT

With reference now to the drawings, and in particular FIG. 1 thereof, the preferred embodiment of the detachable light system 20 in combination with the locking mechanism 30 of the present invention will be described.

A support assembly 50, attached to a vehicle by an attachment means is mated to a rectangular plate 49 by a plurality of connector plugs 41 in communication with a plurality of recessive channels 36 in support assembly 50. The rectangular plate 49 is attached to a light housing 21 to form the light assembly 40. The detachable light system 20 comprising of locking mechanism 30 engaging support assembly 50 with rectangular plate 49 is more specifically described in FIGS. 2, 3, 4&5.

As illustrated in FIGS. 2, 3, 6 & 7 the locking mechanism consists of an L-shaped member 30 having a horizontally extending plate 35 with a hole 38 centrally positioned at a distal end of the horizontal plate 35. The L-shaped member further consisting of a downward depending section 37 positioned within support assembly 50 having a retractable means for upward and downward movement within support assembly 50. FIGS. 6 & 7 further illustrate the retractable positioning of the downward depending section 37 within the support assembly 50.

Support assembly 50 consisting of essentially two flat rectangular members 51 & 52 joined by an attachment means 53, such as a nut and bolt, which is further attached to a vehicle, such as a boat trailer. Support assembly 50 further consisting of a plurality of recessive channels 36 extending through rectangular member 51.

Also illustrated in FIG. 3 is rectangular plate 49 having a plurality of connector prongs 41 extending perpendicularly from an inner side 47. At least one connector prong 41 having a cut-out section 44. Rectangular plate 49 further consisting of a centrally positioned receiving pin 45 extending upwardly from a top side 46 of rectangular plate 49. Light housing 21 being attached to rectangular plate 49 at an outer side 48 by an attachment means.

As illustrated in FIG. 2, the L-shaped member 30 in an upward position the horizontal extending plate 35 is free from receiving pin 45 allowing disengagement of rectangular plate 49 from support member 50, as illustrated in FIG. 3.

Further illustrated in FIG. 6, the downward depending section 37 in the upward position is removed from the cut-out section 44 of connector prong 41 for disengagement.

In FIGS. 4, 5&7 the locking mechanism in the engaged position is illustrated describing the multi-point locking means of the present invention. FIG. 5 illustrates the support assembly 50 and the lighting assembly 40 engaged by communication of the plurality of prong connectors 41 of rectangular plate 49 aligned with the recessive channels 36 of support member 50.

As illustrated in FIGS. 4, 5&7, the retractable downward depending section 37 of L-shaped member 30 in a downward position engages support assembly 50 and light assembly 40 by interlocking horizontal plate 35 through communication with the receiving pin 45 at the distal hole 38 providing the first point of the locking means of the present invention.

As illustrated in FIG. 5, the downward depending section 37 of L-shaped member 30 being in communication with the cut-out section 44 of connector prong 41 in the mated position with support assembly 50 providing a second point of locking means of the present invention.

As further illustrated in FIGS. 6 & 7, the downward depending section 37 is sandwiched between rectangular members 51 and 52 of support assembly 50. Downward depending section 37 is in alignment with the cut-out portion 44 of connector plug 41. As illustrated in FIG. 7, the two point locking mechanism of the present invention is shown in the engaged position with the L-shaped member 30 in a downward position providing communication of horizontal plate 35 with receiving pin 45 of the light assembly 40 providing one point of locking means and simultaneously, the downward depending section in communication with the cut-out section 44 of connector plug 41 providing a second point of locking means.

The two point locking means of the present invention providing an improved locking mechanism. The improved locking mechanism providing a more durable and secure locking means for travel under any road conditions and for an unlimited duration of time. Additionally, the improved locking mechanism provides all the features of the prior art in ease and quickness in detaching and engaging the light housing and light assembly from the support assembly.

The foregoing description of the present and its concepts to this illustrative embodiment, considered with the accompany drawings provides in combination an improved locking mechanism with a detachable lighting system for use on vehicles, specifically boat trailers. The locking mechanism of the present invention providing utility from various standpoints such as pointed out herein, yielding desired advantages and characteristics including those hereinbefore pointed out and others which are inherent in the invention.

Modifications and variations may be effected without departing from the scope of the invention, accordingly the invention is not limited to the specific embodiment or form or arrangement of parts herein described or shown.

Figure 1:
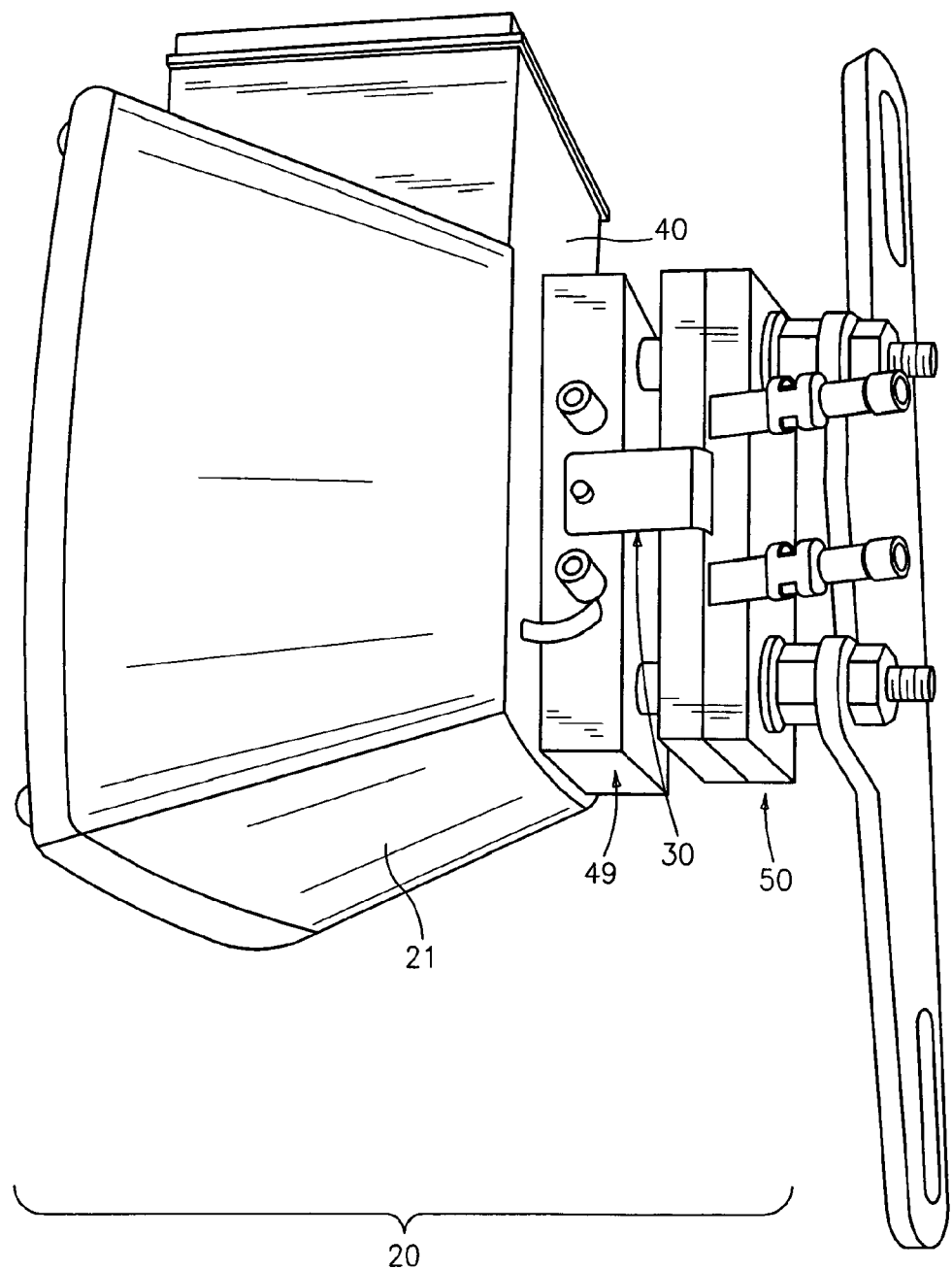
FIG. 1 is a perspective view of the detachable light system in combination with the locking mechanism of the present invention in the engaged position.
Figure 2:
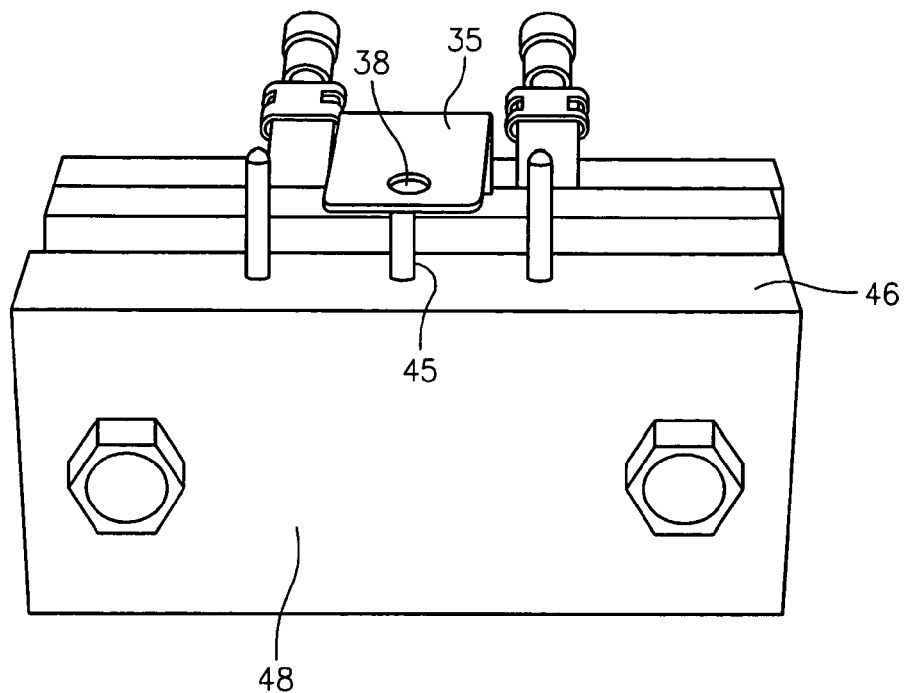
FIG. 2 is a perspective view of the support assembly and the rectangular plate of the light assembly with the L-shaped member of the locking mechanism in an upright position.
Figure 3:
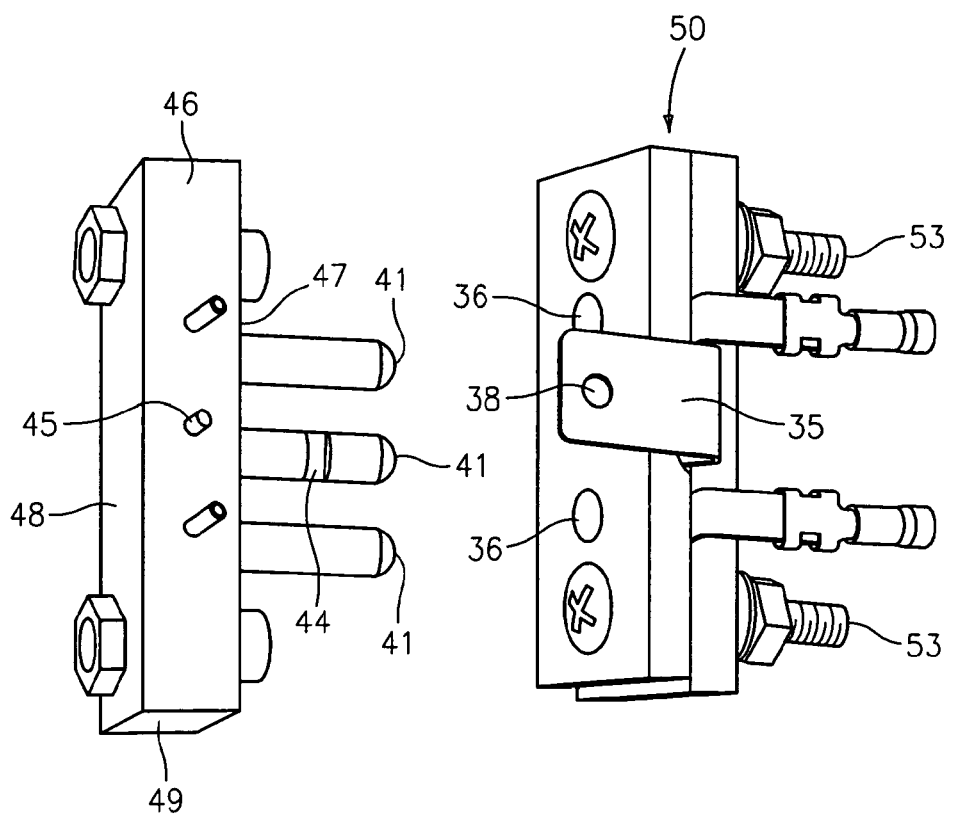
FIG. 3 is a top elevation view of the support assembly detached from the rectangular plate of the light assembly illustrating the horizontal plate with the distally positioned hole, the receiving pin on the top side of the rectangular plate and the cut-out section of a connector plug.
Figure 4:
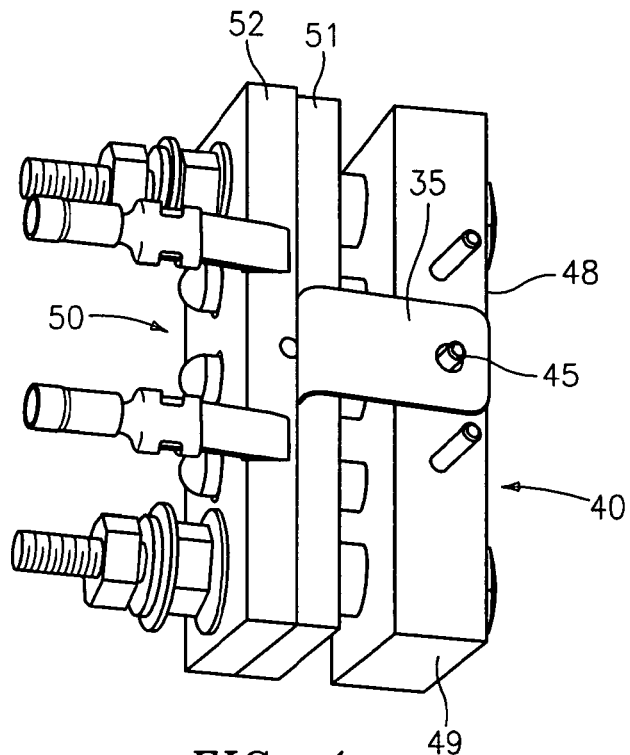
FIG. 4 is a top elevation view of the horizontal plate of the L-shape member of the locking mechanism of the present invention with the hole aligned to a receiving pin on the light assembly engaging the mated support assembly and the rectangular plate.
Figure 5:
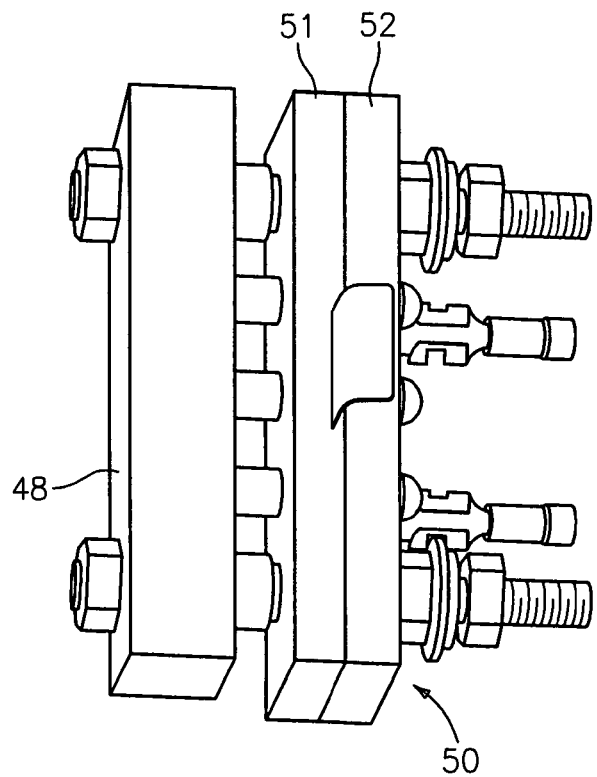
FIG. 5 is a top elevation view of the downward depending section of the L-shaped member retractable positioned between the flat members of the support assembly.
Figure 6:
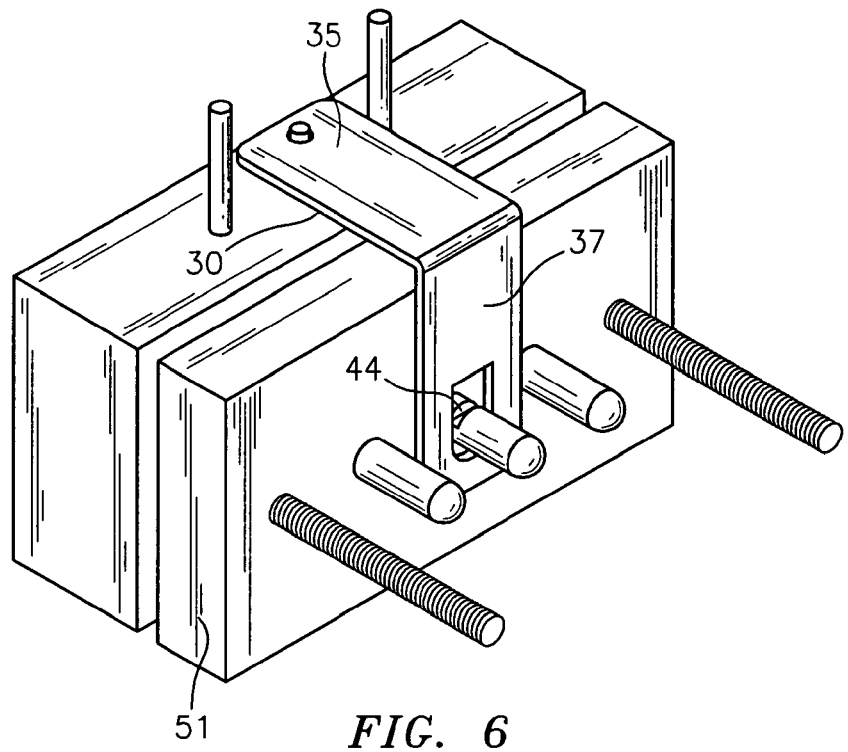
FIG. 6 is an isolated side elevation illustrating the downward depending section of the L-shaped member of the locking mechanism in alignment with the cut out section of the connector plug in the disengaged position.
Figure 7:
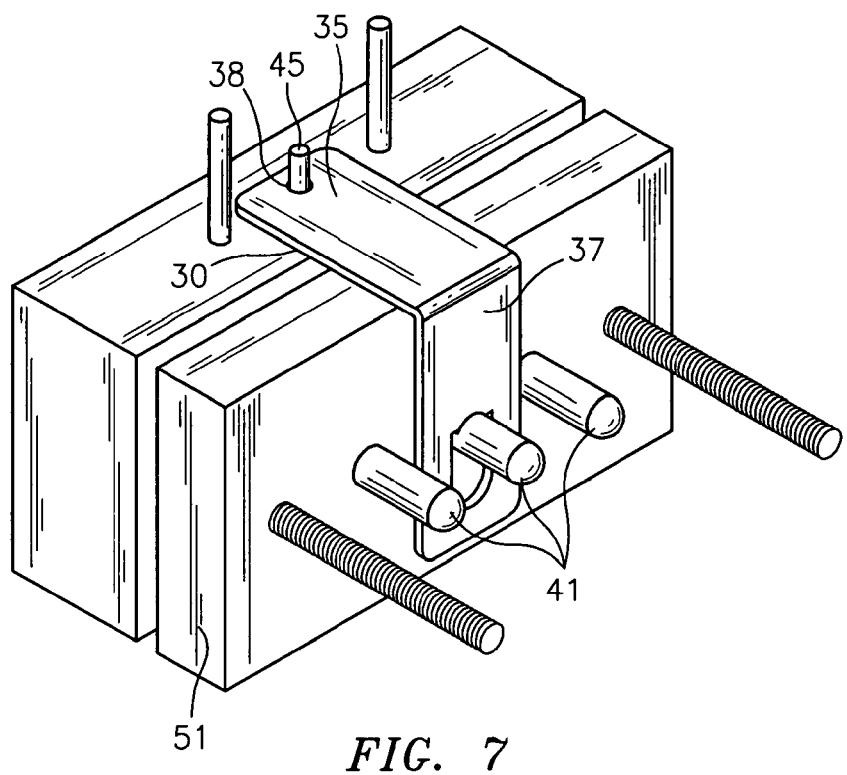
FIG. 7 is an isolated side elevation of the multi-point locking mechanism in the engaged position of the present invention illustrating the rectangular plate of the L-shaped member in communication with the receiving pin of the support assembly and the downward depending section in communication with the cut-out portion of the connector plug.

What is claimed as being new and desired to be protected by Letters Patent of the United States is as follows:

1. A new and improved locking mechanism in combination with a detachable lamp assembly, the improved locking mechanism comprising:
  (a) a L-shaped member having a horizontal extending plate and a downward depending section, the horizontal plate having a hole positioned distally from the downward depending section;

(b) a support assembly mounted to a vehicle comprising of two rectangular members positioned side by side with at least one side having a plurality of recessive channels, the downward depending section being retractably positioned within the rectangular members;

(c) a light assembly consisting of a lamp housing attached to a rectangular plate at a first side, the plate having a plurality of connector plugs extending perpendicularly from a second side, at least one of the connector plugs having a cut-out portion for communication of the downward depending section when the support assembly and light assembly are mated by communication of the connector plugs and the recessive channels; and, (d) a receiving pin positioned centrally on a top side of the rectangular plate, the pin being aligned and in communication with the horizontal plate at the distal hole during engagement.

2. The new and improved locking mechanism defined in claim 1, wherein said L-shaped member is made of corrosive resistant material.

\* \* \* \* \*